United States Patent [19]

Roy

[11] Patent Number: 5,603,740
[45] Date of Patent: Feb. 18, 1997

[54] SUCTION ACTIVATED RECIPROCATING SYSTEM

[76] Inventor: Michel Roy, 1301, rue Jean Guy, Prévost, Québec, Canada, J0R 1T0

[21] Appl. No.: 411,182

[22] Filed: Mar. 27, 1995

[51] Int. Cl.⁶ .................................................. B01D 41/00
[52] U.S. Cl. ................... 55/283; 15/352; 55/298; 55/300; 55/304; 55/337; 95/282
[58] Field of Search ................................ 15/352; 55/283, 55/295, 296, 297, 298, 300, 304, 337; 95/282, 268

[56] References Cited

U.S. PATENT DOCUMENTS

| 1,153,751 | 9/1915 | Beth | 55/304 |
| 3,111,024 | 11/1963 | Sarver | 55/300 |
| 4,193,264 | 3/1980 | Takahashi | 60/397 |
| 4,277,265 | 7/1981 | Leinfelt | 55/304 |
| 5,099,544 | 3/1992 | Yamamoto | 15/339 |
| 5,191,673 | 3/1993 | Damizet | 15/314 |
| 5,201,095 | 4/1993 | Choi | 15/339 |

FOREIGN PATENT DOCUMENTS

| 700178 | 12/1979 | U.S.S.R. | 55/304 |
| 718135 | 2/1980 | U.S.S.R. | 55/304 |
| 762933 | 9/1980 | U.S.S.R. | 55/304 |
| 1808355 | 4/1993 | U.S.S.R. | 55/304 |

Primary Examiner—C. Scott Bushey
Attorney, Agent, or Firm—François Martineau

[57] ABSTRACT

A suction source is connected to the upper end of a vertical suction tube; a plug member slides upwardly within the tube under the action of the suction source and moves down by gravity when the suction source is cut off The suction tube has a bypass port above the plug member and a valve is operated by the movement of the plug member to close and open the bypass port when the plug reaches its lower and upper limit positions respectively. Therefore, the plug continuously reciprocates up by suction and down by gravity upon sequential closing and opening of the valve. The system is incorporated in a central vacuum cleaning apparatus which provides the suction source and has a filter. The reciprocating movement of the plug drives a hammer or brush to continuously remove the dirt accumulating on the filter.

13 Claims, 10 Drawing Sheets

SUCTION ACTIVATED RECIPROCATING SYSTEM

FIELD OF THE INVENTION

The present invention is directed to a system in which a part is continuously reciprocated under the action of a suction source and more particularly to an application of such a system to continuously remove the dust accumulated on the filter of a central vacuum cleaning apparatus.

BACKGROUND OF THE INVENTION

It is known to use a suction force to operate a device between two states. For instance, in U.S. Pat. No. 5,099,544, an electric switch is closed when suction is present and this switch opens when the suction is discontinued.

It is desirable to provide a system in which a part is continuously moved in a reciprocating movement under the action of a suction source.

In a known type of central vacuum cleaning apparatus, the dust conveyed by the suction lines is discharged by a cyclone device into a dust collecting tank: heavier dust particles settle in the bottom of the tank whereas the finer dust particles accumulate against a filter; the filtered air can be discharged within the building. However, frequent cleaning of the filter is required to prevent decrease of the cleaning efficiency of the apparatus. Filter cleaning is usually effected manually, however there exists an automatic filter cleaning device which consists of a weight secured to the lower end of the filter which is conical in shape. The filter and weight moves up when suction is applied and upon stoppage of the cleaning apparatus, the weight drops down thereby shaking the filter to remove the dust adhering thereto. Tests have shown that this system can be improved upon since dust removal has been found rather inefficient because filter shaking occurs only when the apparatus is turned off and often the weight drops too slowly.

OBJECTS OF THE INVENTION

It is therefore an object of the invention to provide a mechanical system operated by a suction source which reciprocates a member continuously while the suction source is operating.

Another object of the present invention is the provision of a system as above described which is applied to a central vacuum cleaning apparatus to cause the reciprocating part to continuously clean the filter of such an apparatus during operation of the latter.

Another object of the present invention is to provide a filter cleaning device for the filter of a central vacuum cleaning apparatus which operates mechanically from the existing suction source of the cleaning apparatus.

SUMMARY OF THE INVENTION

In accordance with the present invention, there is provided a suction activated reciprocating system which comprises a generally upright tube, a suction source connected to the upper end of the tube, a plug slidable within the suction tube for upward movement to a limit upward position under the action of the suction source and for downward movement under gravity to a limit downward position when suction is not exerted on said plug through said tube, said tube having a bypass port located above said plug while the latter is in its upward limit position and further comprising a valve member located in said tube above said plug and operable by said plug to take a valve position opening said bypass port during upward movement of said plug and operable by gravity to take a valve position closing said bypass port during downward movement of said plug, whereby said plug continuously reciprocates up by suction and down by gravity upon sequential closing and opening of said bypass port.

Preferably, there are means to adjust the reciprocating frequency of said plug.

Preferably, the system further includes bypass means which are manually adjustable, which is connected to the suction source in parallel with the suction tube so as to adjust the amount of suction exerted on said plug.

The invention further includes the combination of the above noted system with a central vacuum operated cleaning system for homes and buildings wherein the apparatus includes a central dust collecting tank with dust transporting suction lines connected to the tank through a tangential tank inlet whereby the collected dust is subjected to a cyclonic effect in the tank, the heavier dust particles collecting at the bottom of the tank, the lighter dust particles being filtered out on a filter carried by a skirt surrounding the suction tube.

In this combination, the reciprocating plug actuates a device which continuously removes the particles adhering to the filter.

Preferably, the filter is cylindrical and the dust removing device consists of a circular brush surrounding the cylindrical filter and connected to the plug for up and down reciprocating movement over the filter.

In another embodiment, the filter closes the lower end of an opened skirt and the brush is a straight brush rotated in an alternating manner about an axis coaxial with the suction tube.

In another embodiment, hammers are directly secured to the plug and are disposed above a flat filter to beat up the filter.

DESCRIPTION OF THE DRAWINGS

In the annexed drawings.

In the following description, like reference characters indicate like elements throughout.

DETAILED DESCRIPTION OF THE PREFERRED EMBODIMENTS

Figure 1:
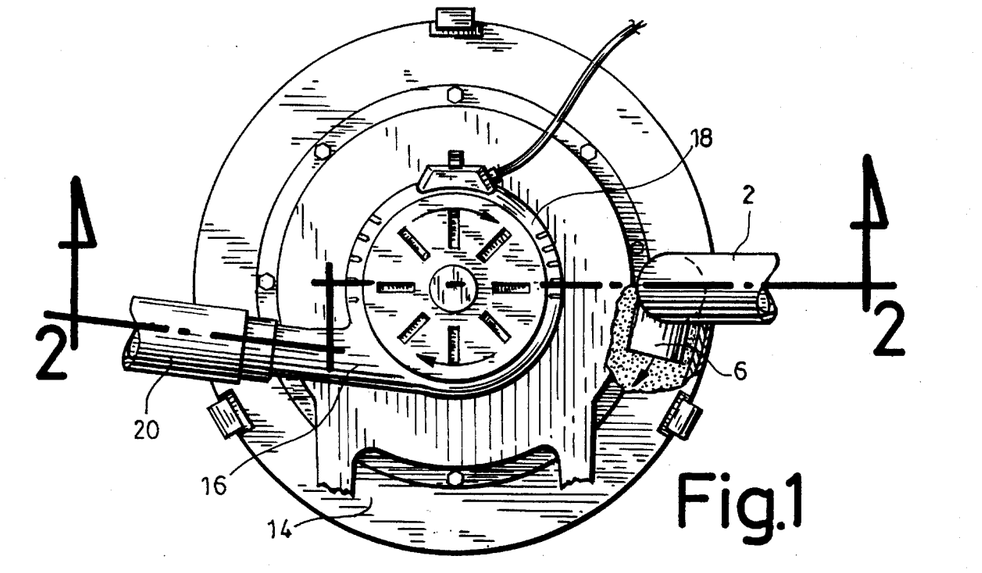
FIG. 1 is a top plan view showing the suction blower and dust collecting tank of a central vacuum cleaning apparatus.
Figure 2:
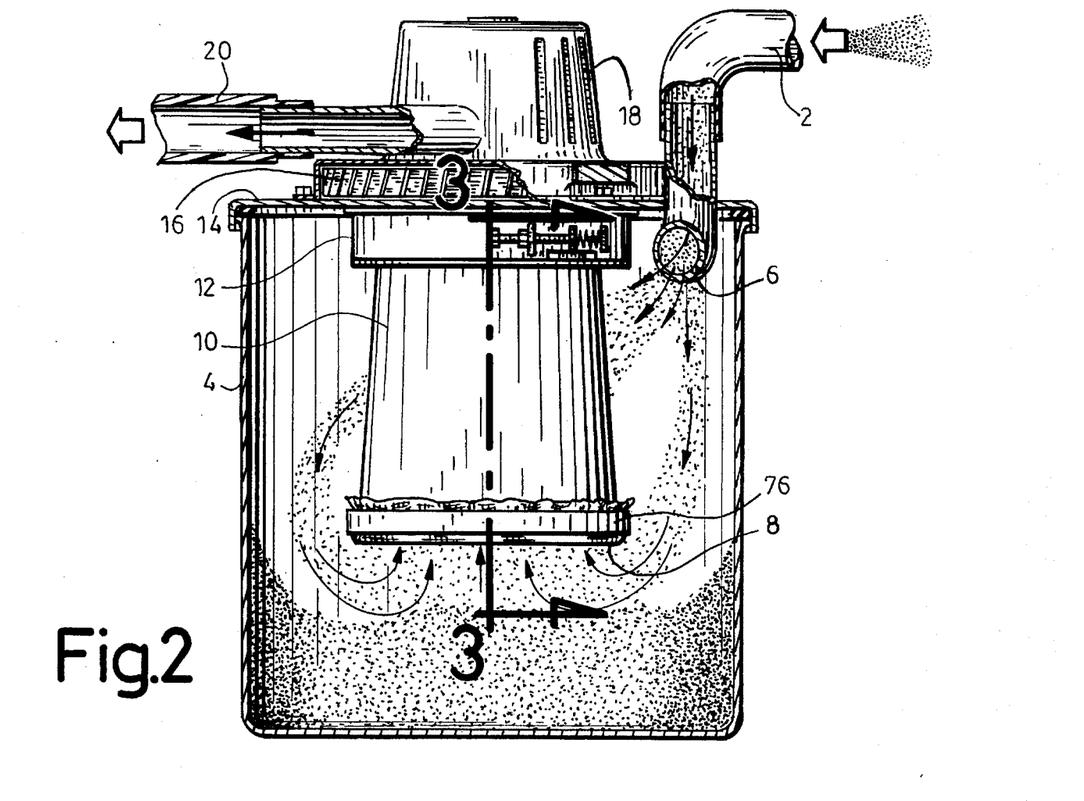
FIG. 2 is a vertical section taken along line 2—2 of FIG. 1.

Referring to FIGS. 1 and 2, there is shown a conventional unit of a central vacuum cleaning apparatus such as installed in buildings or homes wherein a plurality of dust conveying suction lines are connected to a pipe 2 and the dust is discharged within a cylindrical dust collecting tank 4 through an elbow 6 which is directed tangentially to the cylindrical wall of tank 4 so as to cause a cyclonic effect on the dust. Therefore, the heavier dust particles collect at the bottom of tank 4 while the lighter dust particles collect on the outer face of a filter 8 extending across and closing the bottom opening of a skirt 10 which depends from and is secured to a chamber 12 which in turn depends from and is secured to a top tank closure plate 14.

An air turbine 16 driven by an electric motor 18 forms a suction source which sucks the filtered air from chamber 12 and discharges said air through a discharge pipe 20. The air can be discharged inside of the house.

Some central vacuum cleaning systems depend solely on the cyclonic effect to collect the dust. However, in those cases, the outlet pipe 20 is normally necessarily connected to an outside air vent to discharge the air outside the house since the air still contains an appreciable amount of dust. That is why most more efficient systems include a filter 8 to filter out finer dust particles and thus allow air discharge by outlet pipe 20 within the house. However, the bottom surface of the filter rapidly becomes clogged with dust and must be cleaned very often, otherwise the cleaning capacity of the whole system rapidly decreases with filter clogging.

In accordance with the invention, a system is incorporated within the central vacuum cleaning apparatus to continuously clean the filter 8 during operation of the apparatus namely of its air turbine 16.

In accordance with the invention, there is provided a suction tube 22 preferably cylindrical which is mounted upright within skirt 10 and coaxially thereof. The upper end 24 of the suction tube 22 is secured to the chamber 12 and is in communication therewith through an opening 26 made in the bottom of chamber 12. The lower open end 28 of suction tube 22 terminates above filter 8.

A plug 30 in the form of a hollow cylindrical body with a top partition 31 is slidable within suction tube 22 for up and down movement through the lower end 28 thereof. The lower end of plug 30 carries a disc 32 to which are secured several radial arms 33 which support hammer blocks 34 which strike and beat filter 8 when plug 30 descends under gravity and which are lifted a certain distance above the filter 8 when the plug 30 is subjected to the suction exerted by the air turbine 16.

Suction tube 22 has lateral bypass ports 36 and a tubular open-ended valve member 38 is slidable within suction tube 22 for up and down movement therein. Valve member 38 is located above plug 30 and is moved upwardly by the latter and can move down under gravity when released by the plug 30. Valve member 38 has lateral ports 40 which register with the bypass ports 36 of suction tube 22 in the upper limit position of the valve member 38 as shown in FIG. 4.

This upper limit position is determined by the provision of a crosswire 42 which extends through holes made in suction tube 22 just below bypass ports 36 and which is retained in position by having bent ends 44.

Crosswire 42 freely extends through the lateral ports 40 of valve member 38. The lower and upper limit positions of the valve member occur when the crosswire abuts against the top and bottom edges respectively of the lateral ports 40. In its lower limit position (see FIG. 3), valve member 38 is in register with bypass ports 36 and closes these ports. In the upper limit position of the valve member 38 (see FIG. 4), its lateral ports 40 register with bypass ports 36.

Figure 3:
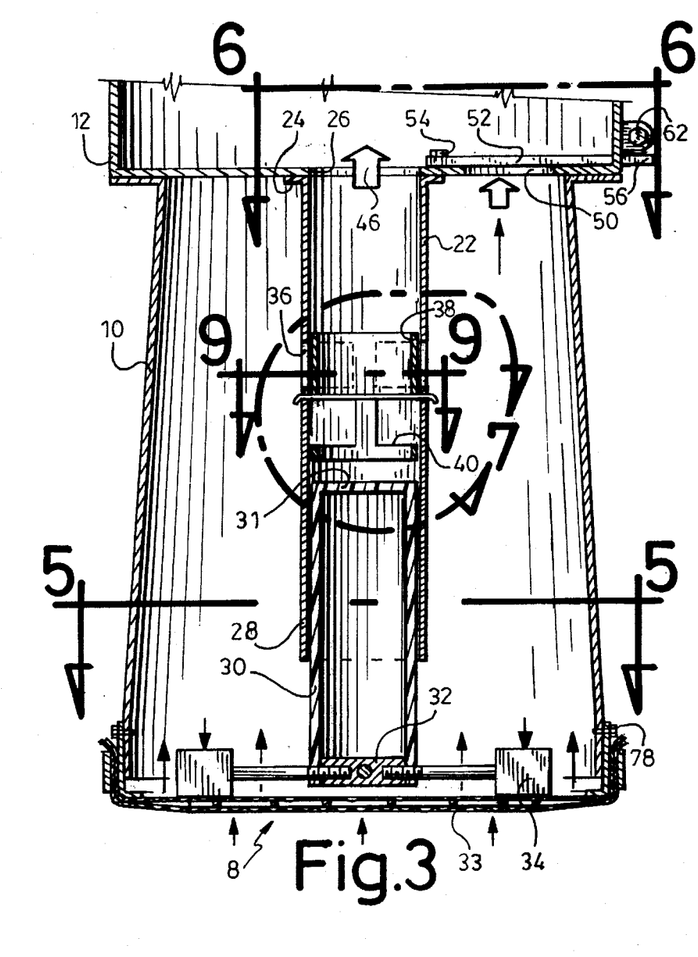
FIGS. 3 and 4 are partial vertical sections taken along line 3—3 of FIG. 2 and showing the valve member and plug in their down position, the plug starting to move up under suction, and in their up position in which the valve is open with the valve member and plug starting to move down under gravity.
Figure 4:
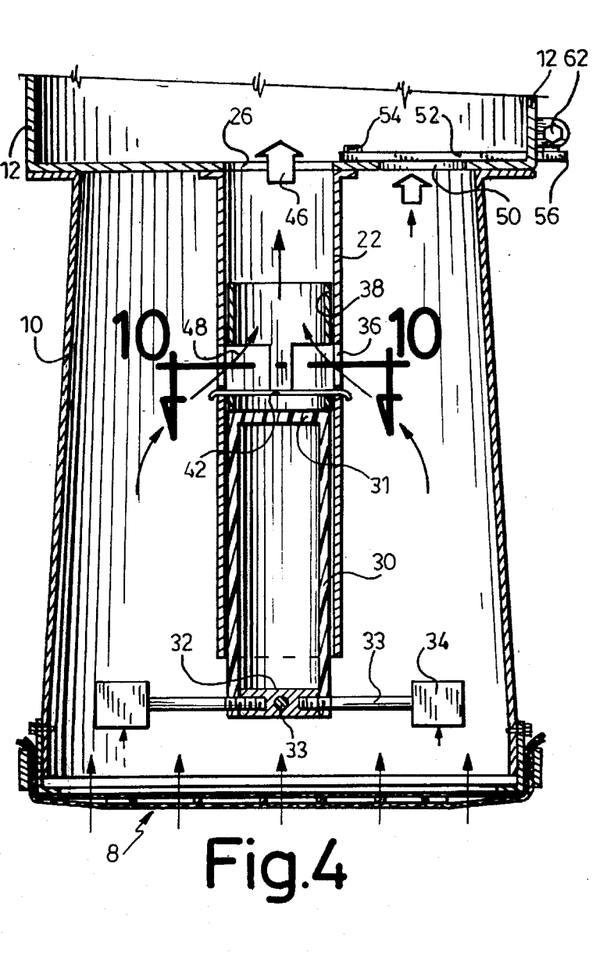

In the bypass port closing position of the valve (as shown in FIG. 3), the suction exerted by air turbine 16 (in accordance with arrow 46) is directly exerted on the plug 30 with sufficient force to raise said plug and the hammer blocks 34; the plug abuts against and raises the valve member 38 to its valve opening position (as shown in FIG. 4). The suction force is no longer exerted on the plug since the sucked air is bypassed through bypass ports 36 (as indicated by arrows 48). The plug drops down under gravity and the hammer blocks 34 effect a beating action on the filter 8. The valve member 38 also moves down under gravity and closes the bypass ports 36 when it reaches the position of FIG. 3 and the cycle is repeated since full suction is again exerted on the plug 30.

The bottom of chamber 12 is provided with a bypass opening 50 which is disposed inside skirt 10 and outside suction tube 12 and which communicates the inside of skirt 10 directly with chamber 12. The effective area of the bypass opening 50 is adjusted by a damper 52 in the form of a plate which overlies the bottom of chamber 12, extends across bypass opening 50 and is pivoted to the chamber bottom at 54. The damper 52 has an outer projection 56 extending through a slit of the cylindrical wall of chamber 12; an upright abutment plate 58 is fixed to projection 56. This plate 58 is sandwiched between a compression coil spring 60 and an adjustment screw 62. Spring 60 is carried by a bracket 64 while screw 62 is screwed through a threaded bracket 66. Brackets 64 and 66 are secured to the cylindrical wall of chamber 12. The amount of air sucked by the air turbine 16 through bypass opening 50 can be adjusted by means of screw 62 which adjusts the pivoted position of damper 52. Therefore, one can adjust the suction force to be exerted on the plug 30 an amount just sufficient to overcome the weight of the plug and of the hammer blocks carried by said plug. It follows that most of the suction force is used to collect and filter the dust.

Figure 10:
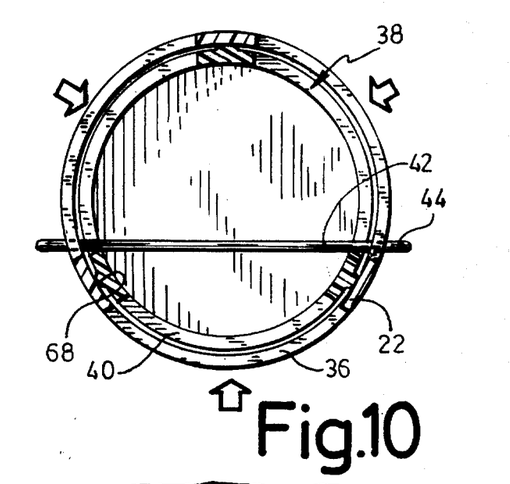

It is noted that crosswire 42 serves also to prevent rotation of the cylindrical valve member 38 so that ports 36 and 40 are in correct register when the valve member is in upper limit position. FIG. 10 shows that there are three lateral ports 40 and three bypass ports 36 arranged at 120° angle and with the crosswire 42 in sliding contact with the upright webs 68 delimiting one port 40.

Figures 5, 6, 7, 8:
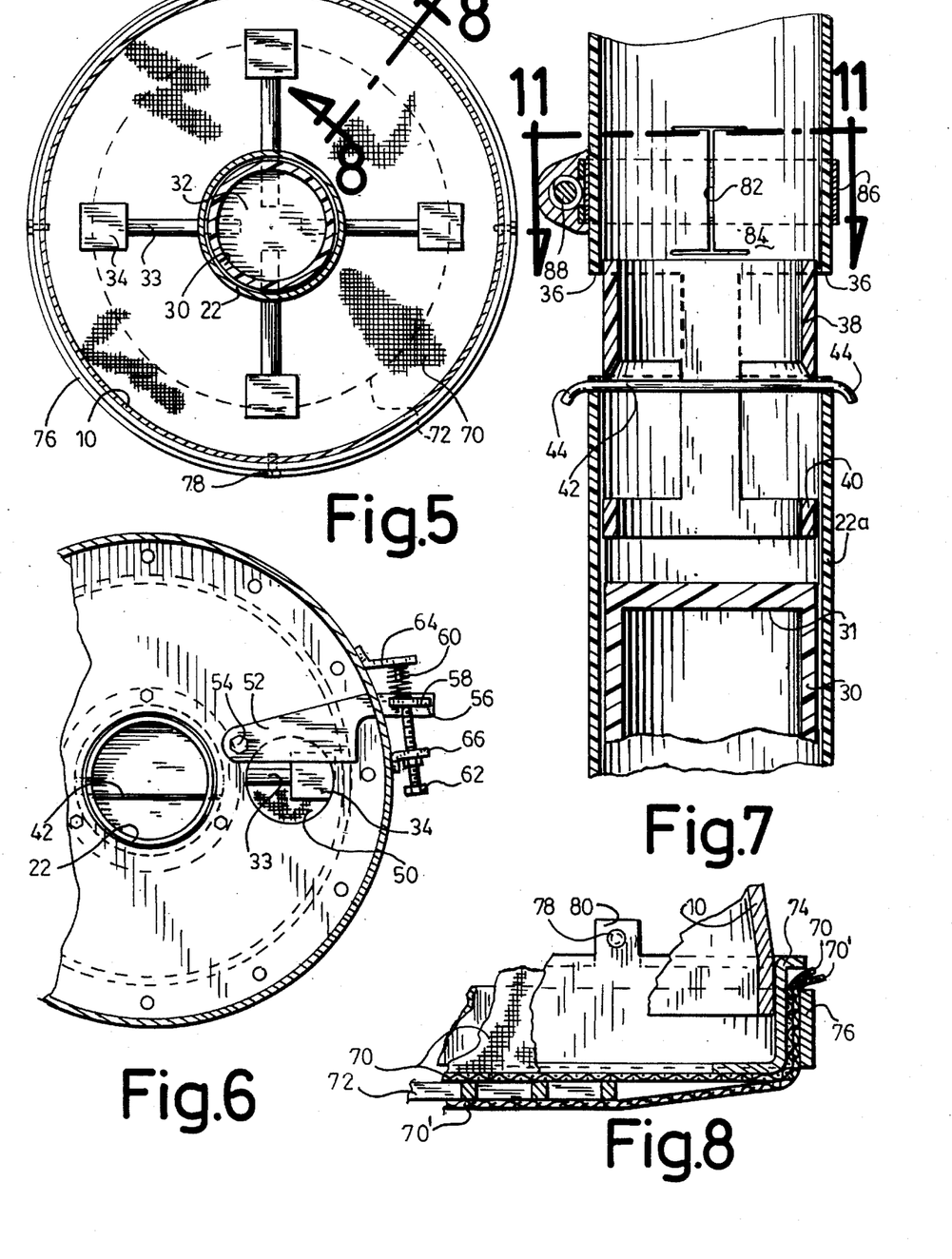
FIG. 5 is a plan section taken along line 5—5 of FIG. 3 but showing a system to retard the downward movement of the valve member.
FIG. 6 is a plan section taken along line 6—6 of FIG. 3.
FIG. 7 is an enlarged view taken in area 7 of FIG. 3 but showing a system to retard the downward movement of the valve member.
FIG. 8 is an enlarged partial cross-section taken along line 8—8 of FIG. 5.
Figure 9:
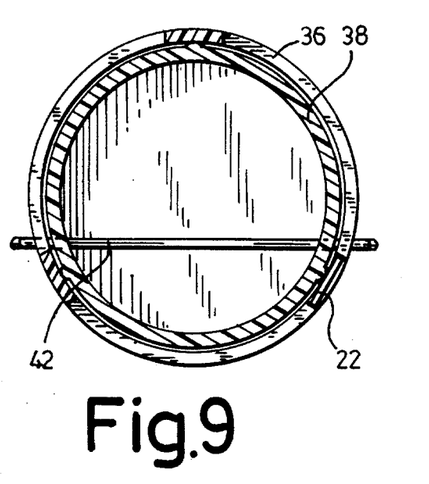
FIGS. 9 and 10 are enlarged plan sections taken along lines 9—9 and 10—10 of FIGS. 3 and 4 respectively.

Referring to FIG. 8, it is seen that the filter 8 consists of two layers 70, 70' of filter cloth separated by a rigid screen 72. The marginal portions of the layers 70, 70' are tightened around a ring 74 by an overlying collar 76. The ring 74 is secured around the lower edge portion of the skirt 10 by bolts 78 extending through ears 80 of ring 74 (as shown in FIGS. 4 and 8).

The screen 72 prevents the filter layers 70, 70' from being torn apart by the action of the hammer blocks 34.

Figure 11:
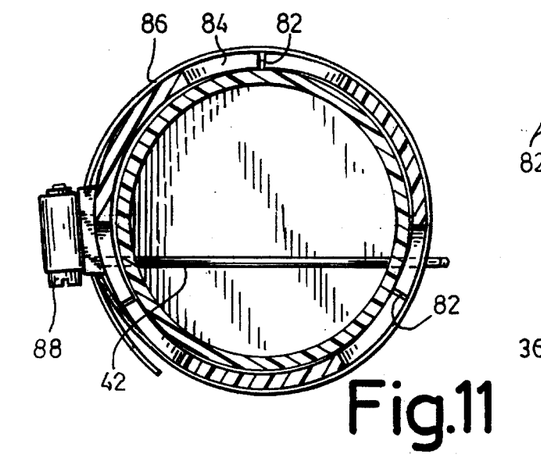
FIG. 11 is a plan section taken along line 11—11 of FIG. 7.
Figure 12:
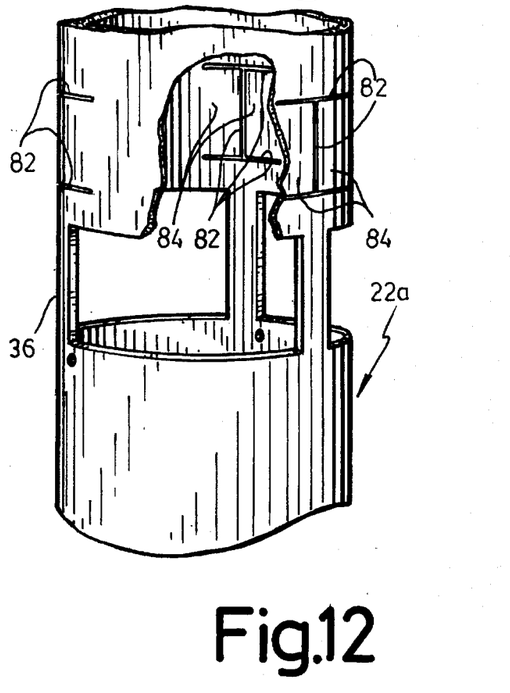
FIG. 12 is a partial perspective view of the suction tube used with the embodiment of FIGS. 7 and 12.
Figure 13:
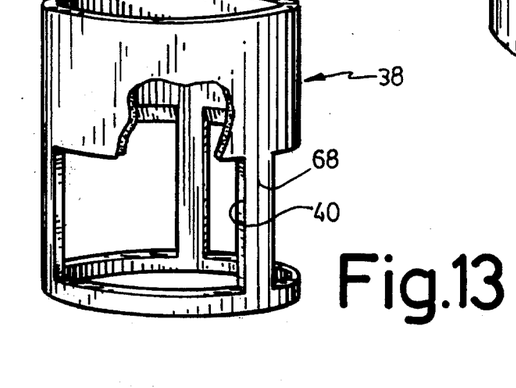
FIG. 13 is a perspective view partially cut away of the valve member used in the first embodiment shown in FIG. 3 and in a second embodiment shown in FIG. 14.

In the system (in accordance with FIGS. 3, 4 and 7) the plug 30 operates at maximum reciprocating frequency. If desired, this frequency may be decreased by frequency adjusting means such as shown in FIGS. 7, 11 and 12; more particularly suction tube 22a is used; it is identical to suction tube 22 except that its wall, just above the bypass ports 36, is slitted to form I-shaped slits 82 which define a plurality of free tongues 84 extending circumferentially of the tube and depending at one end from the wall of the tube.

A tightening collar 86 surrounds the tongue 84 and can be tightened by the adjusting screw 88. Tightening collar 86 is conventional and is used for tightening rubber tubes about nipples. Therefore, the inner diameter of the suction tube 22 in its area just above lateral ports 40 can be adjusted so as to engage tubular valve member 38 with an adjusted friction when the latter attains its uppermost limit position. Therefore, once the plug 30 has started to descend, the start of the descent of the valve member 38 can be retarded in proportion to the friction exerted by the tongues 84 on the same.

Figure 14:
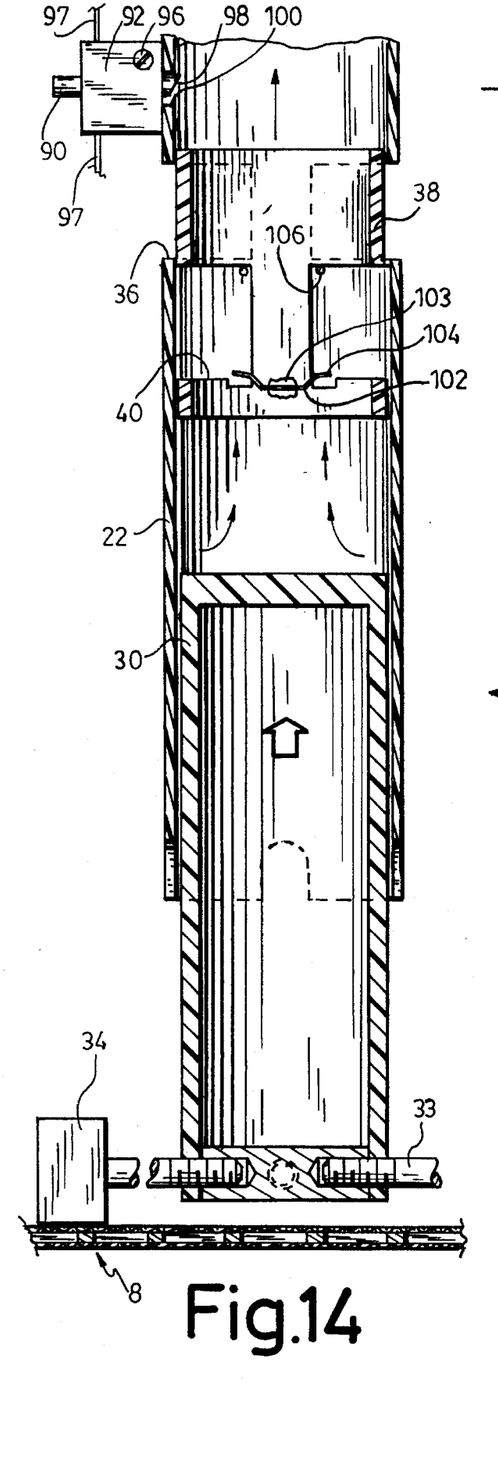
FIG. 14 is a vertical section of a second embodiment of the filter beating system similar to that shown in FIG. 3.
Figure 15:
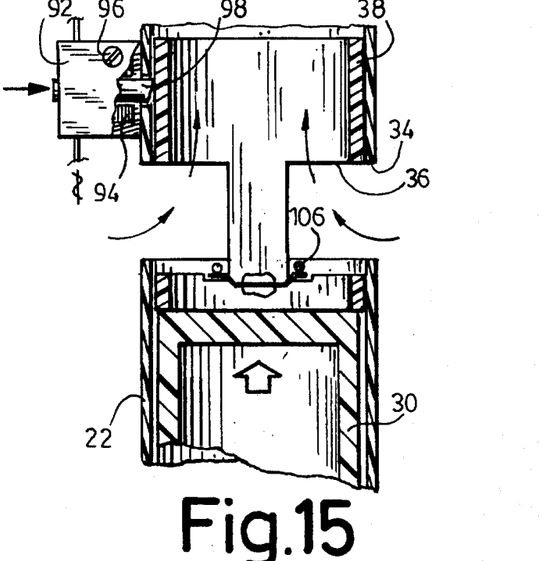
FIG. 15 is a partial section similar to that of FIG. 14 but showing the valve member retained in its upper limit position opening the bypass ports of the suction tube.
Figure 16:
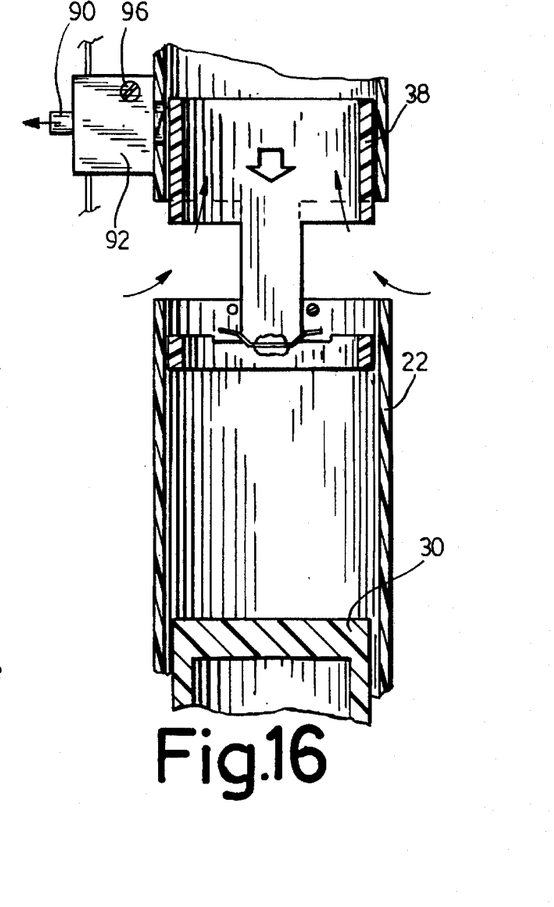
FIG. 16 is a partial view, similar to that of FIG. 15, showing the valve member released and starting to move down to a bypass port closing position.
Figure 17:
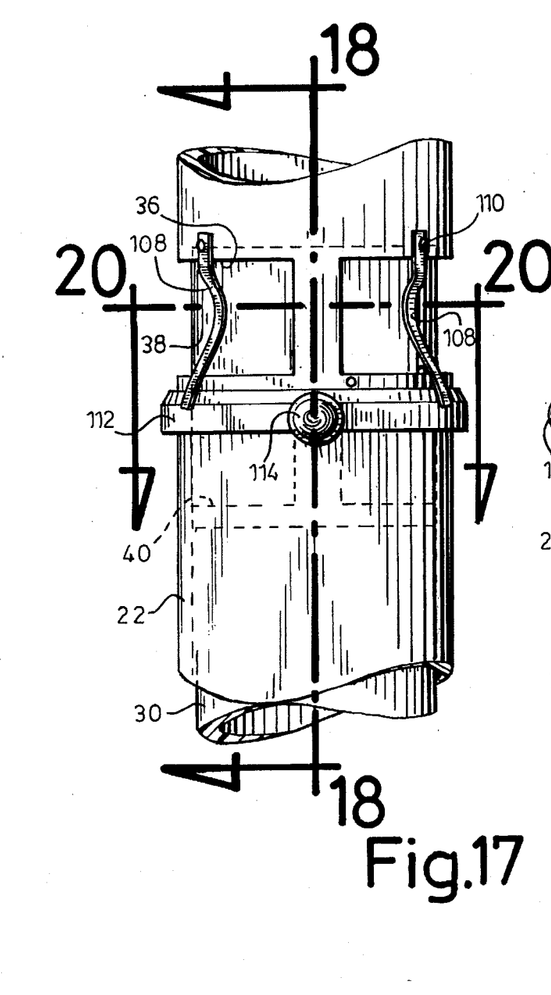
FIG. 17 is a partial elevation of a third embodiment of the suction tube.
Figures 18, 19, 20:
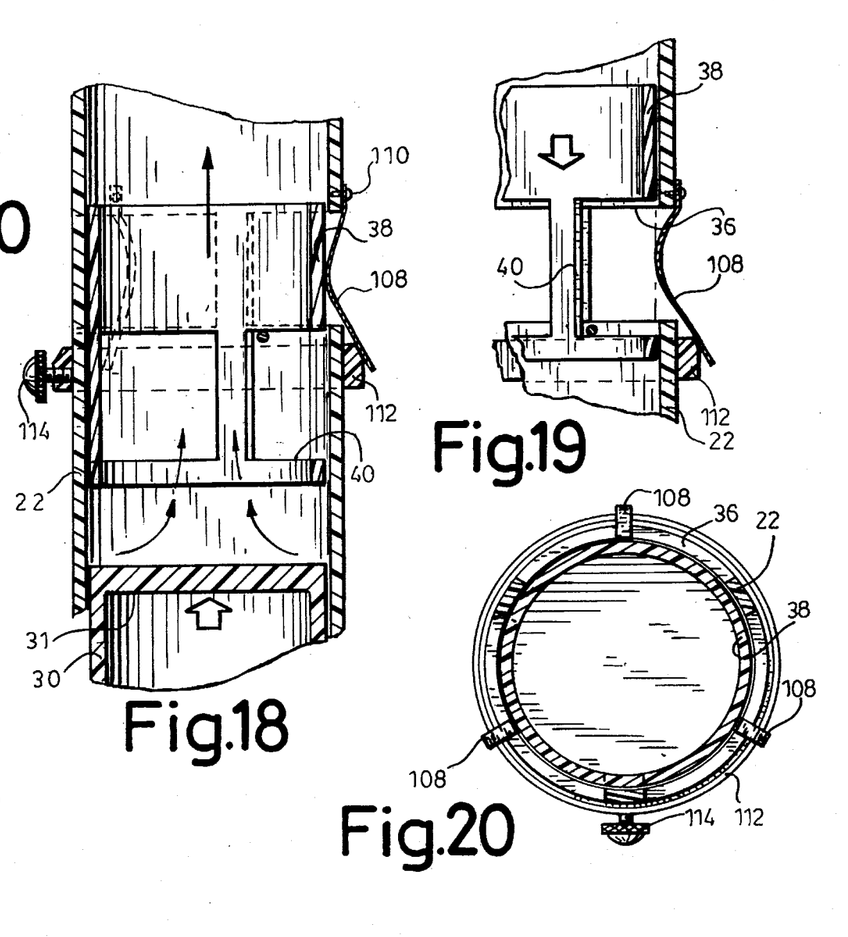
FIG. 18 is a partial cross-section taken along line 18—18 of FIG. 17.
FIG. 19 is partial view similar to that of FIG. 18 with the valve member in its upper limit position.
FIG. 20 is a plan section taken along line 20—20 of FIG. 17.

FIGS. 14 to 16 show another embodiment for adjusting the reciprocating frequency of plug 30. The arrangement of the suction tube 22, plug 30, valve member 38, hammer blocks 34 and filter 8 is the same as in FIGS. 2 and 3.

A solenoid operated plunger 90 is mounted in a block 92 secured to the side of the suction tube just above the bypass ports 36. Plunger 90 is urged to its advanced position of FIG. 14 by a spring (not shown) located in block 92. The solenoid 94 for fully retracting the plunger 90 against the bias of the spring is connected in a circuit including a normal switch and a delay switch located within block 92, the delay switch being manually adjusted by a screw 96. The circuit is connected by wires 97 to an outside source of electricity (as shown in FIG. 14). In the advanced position of plunger 90, its bevelled end 98 just protrudes inside suction tube 22, the plunger freely extending through hole 100 made in suction tube 22.

Upon upward movement of the valve member 38, its upper edge engages bevelled end 98 of plunger 90, the plunger retracts to an intermediate position against the bias of the spring and causes closing of the delay switch. After the delay has expired as set by screw 96, the normal switch closes the circuit of solenoid 94 which fully retracts the plunger 90 (see FIG. 16), thereby releasing the valve member 38 which is free to descend under gravity. While in its intermediate position (see FIG. 15), plunger 90 retains valve member 38.

FIGS. 14 to 16 also show another manner of preventing rotation of the valve member 38. Crosswire 42 is replaced by a guide wire 102 having its centre portion glued at 103 to the inside of the valve member 38 and having its bent ends 104 extending through adjacent lateral ports 40 to be in slidable contact with the inside face of suction tube 22. In the upper limit position of the valve member (as shown in FIG. 15) the bent ends 104 of wires 102 abuts against stop screws 106 protruding from the suction tube just below bypass ports 36.

FIGS. 17 to 20 show another embodiment of the means to adjust the reciprocating frequency of the plug 30. Three inwardly bent spring strip 108 are secured by rivets 110 to the suction tube 22 at their top ends and extend downwardly across the respective bypass ports 36 so as to frictionally engage and retain valve member 38 after the latter has started its descent from its uppermost position. The lower ends of each spring strip 108 overlies an adjustable collar 112 surrounding suction tube 22 and the axial position of which can be set by a set screw 114 which is tightened against suction tube 22. The friction exerted by the spring strips 108 on the valve member 38 can be finely adjusted to exert a friction force insufficient to prevent dropping of the valve under gravity but sufficient to adjustably decrease the speed of descent of the valve member while engaged by the strips 108.

Figure 21:
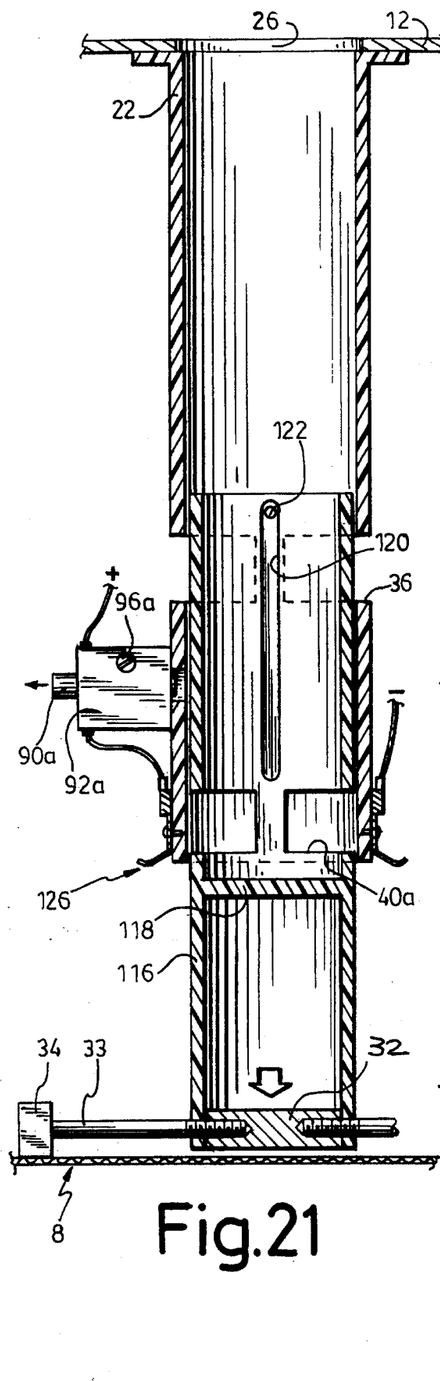
FIGS. 21 and 22 are vertical sections of another embodiment of the suction tube and valve member in the valve closing position and opening position respectively.
Figure 22:
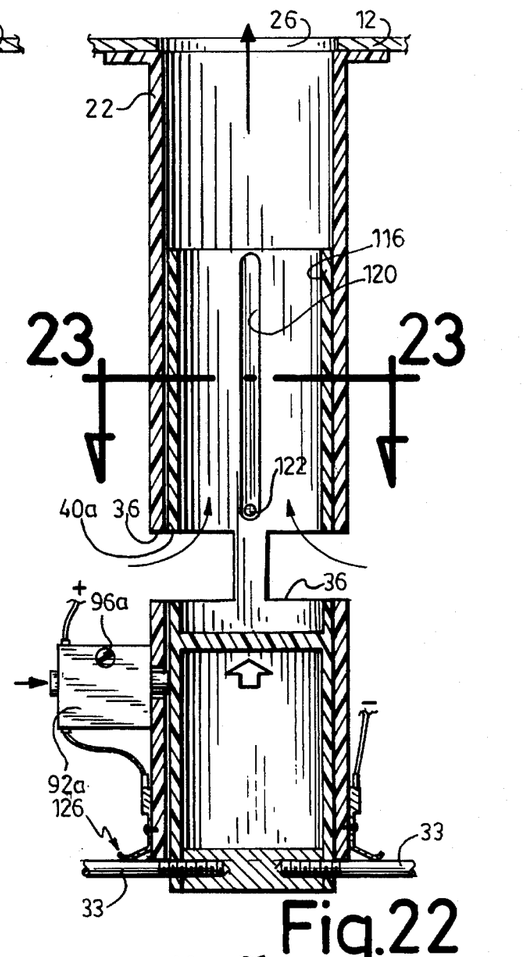
Figure 23:
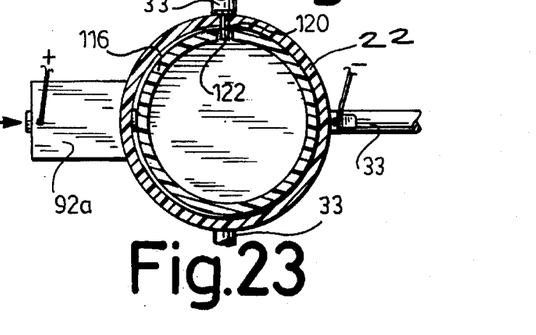
FIG. 23 is a plan section taken along line 23—23 of FIG. 22.

FIGS. 21 to 23 show an embodiment in which the separate parts formed by the plug 30 and valve member 38 of the embodiments of FIGS. 2 and 3 is replaced by a single unit formed by a tube which is slidable in suction tube 22 and is provided with a partition 118 which is equivalent to the plug 30. Lateral ports 40a are formed above partition 118, they are the equivalent of the ports 40 of valve member 38. The portion of the tubular unit 116 extending above port 40a is much longer than the equivalent portion of valve member 38 so as to obtain a stroke about equal to the stroke required by plug 30 of FIGS. 2 and 3 to lift the lateral ports 40 to a position in register with the bypass ports 36 of suction tube 22.

This embodiment also shows another means to prevent rotation of the unit 116 so that ports 40a will properly always register with bypass ports 36 in the uppermost limit position of valve and plug unit 116. These means consist of an elongated slot 120 made through the wall of tubular unit 116 above lateral ports 40a, the slot being engaged by a guiding pin 122 protruding from and fixed to the suction tube 22.

FIGS. 21 to 23 also show another means to decrease the frequency of the reciprocating movement of combined valve and plug unit 116. A block 92a is fixed to suction tube 22 and carries a plunger 90a which freely extends through a hole made in the suction tube; block 92a contains a delay switch, the delay of which can be adjusted by adjusting screw 96a, block 92a also contains a solenoid which, when actuated, advances the plunger 90a to an advanced position against the action of a coil spring (not shown). The delay switch in block 92a is series connected with a second switch formed by contacts 126 secured to the lower edge of suction tube 22 and adapted to make electrical contact with the registering pair of radial arms 33 carrying the hammer blocks 34. Closing of switch formed by contacts 126 occurs only when unit 116 has reached its uppermost position (as shown in FIG. 22) in which the guiding pin 122 abuts against the lower end of slot 120 and ports 36 and 40a are in full register.

It is noted that the electrical path between the two arms 33 is established by the electrically conductive disk 32 inserted within the lower end of unit 116 and into which the arms 33 are screwed.

Plunger 90a is normally held in a retracted position (as shown in FIG. 21) under the action of the coil spring (not shown) located within block 92a. When the unit 116 reaches its uppermost position, second switch 126 is closed and the delay switch within the block 92a closes the circuit to the solenoid which causes advancement of the plunger 90a to contact and retain unit 116 in uppermost position. This is effected against the action of the coil spring which tends to retract the plunger 90a.

After the adjusted delay is expired, the solenoid is de-energized, the plunger retracts under the action of coil spring to its rest position (shown in FIG. 21) and the unit 116 drops under gravity. With an increasing time delay, the frequency of reciprocating movement of unit 116 is decreased.

Figure 24:
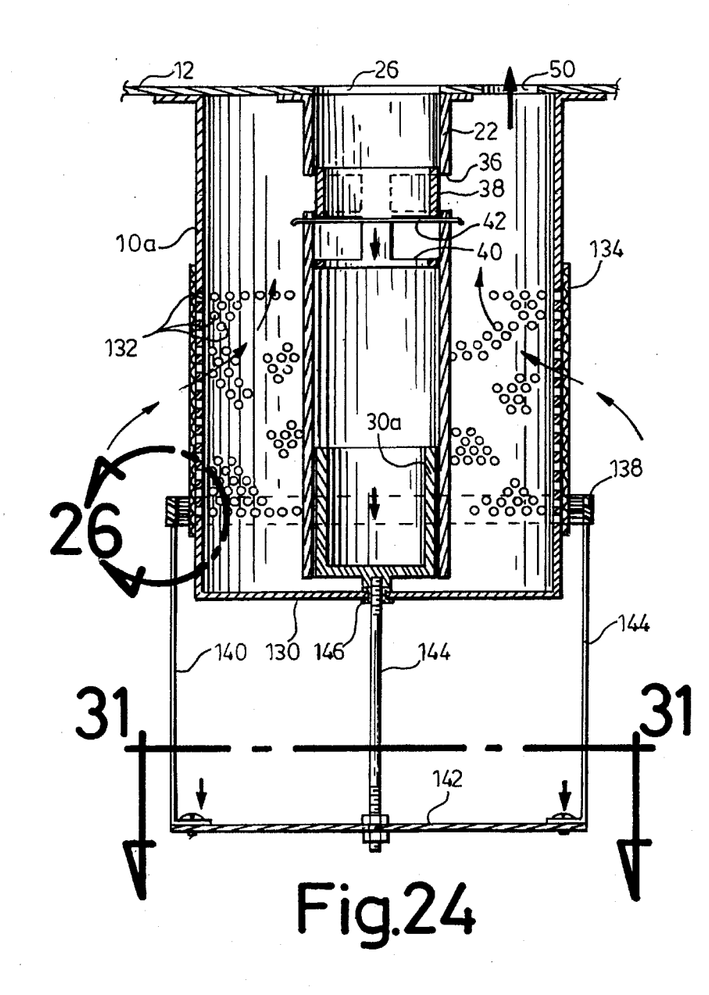
FIGS. 24 and 25 are vertical sections of yet another embodiment of the system to clean the filter of a central vacuum cleaning apparatus in the valve closing and opening position respectively.
Figures 25, 26:
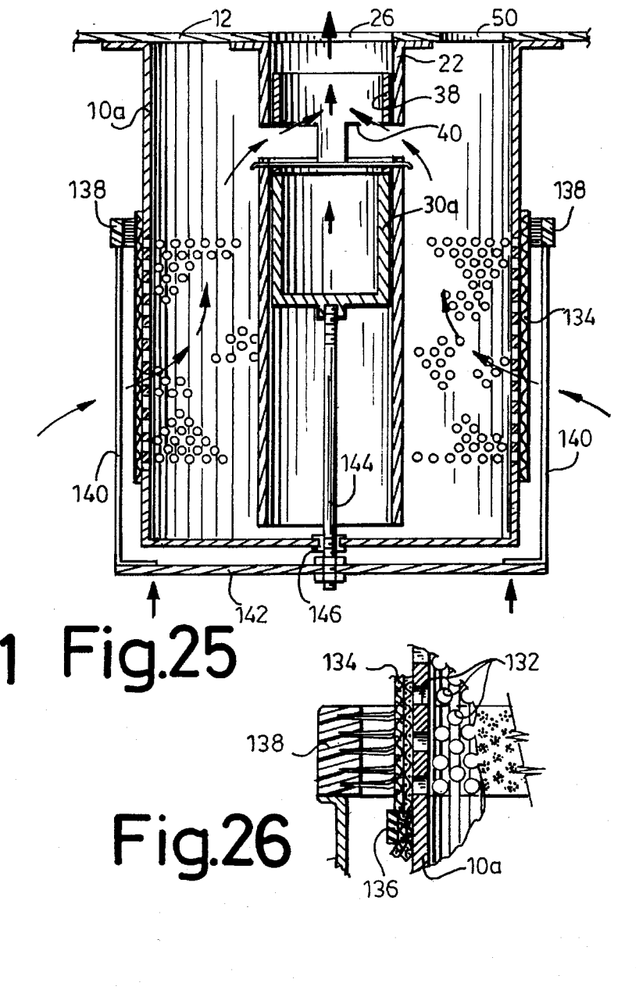
FIG. 26 is a partial vertical section on an enlarged scale taken in area 26 of FIG. 24.

FIGS. 24 to 26 show another embodiment in which, instead of cleaning the filter unit by a beating action on the inside, a brush is in sweeping contact with the external surface of the filter on which dust particles are deposited. The assembly of chamber 12, suction tube 22, and valve member 38 are as in the first embodiment of FIGS. 2 and 3 however, plug 30 is replaced by a cup-shaped plug 30a, the skirt 10 is replaced by a modified skirt 10a which is cylindrical and has a bottom wall 130.

The cylindrical walls of skirt 10a is provided with a series of perforations 132 covered by a removable filter 134 preferably consisting of two filtering layers held against the outside of the perforations 132 by retaining rings 136.

A circular brush 138 surrounds the filter 134 with brush bristles in frictional contact the outside layer of filter 134. The circular brush 138 is fixed to the upper end of three strips 140 which are vertically disposed on the outside skirt 10a and which are secured at their lower end to a spider 142, the centre of which is connected by a rod 144 to the bottom of the cup-shaped plug 30a, rod 144 slidably extends through a sealing grommet 146 lining a central hole in the bottom wall 130 of skirt 10a. It is apparent that up and down movement of plug 30a causes up and down movement of the circular brush 138 to constantly sweep and clean the outer surface of filter 134. By adding an adjustable weight in the cup-shaped 30a such as sand or gravel, one can adjust the descending speed of plug 30a and brush 138 and therefore the frequency of vertical reciprocating movement of the plug 30a. Tests have shown that one up and down movement of plug 30a and brush 138 per 30 seconds to 2 minutes is acceptable, the preferred duration of the cycle being 1 minute to keep the filter clean.

Figures 27, 28, 29, 30:
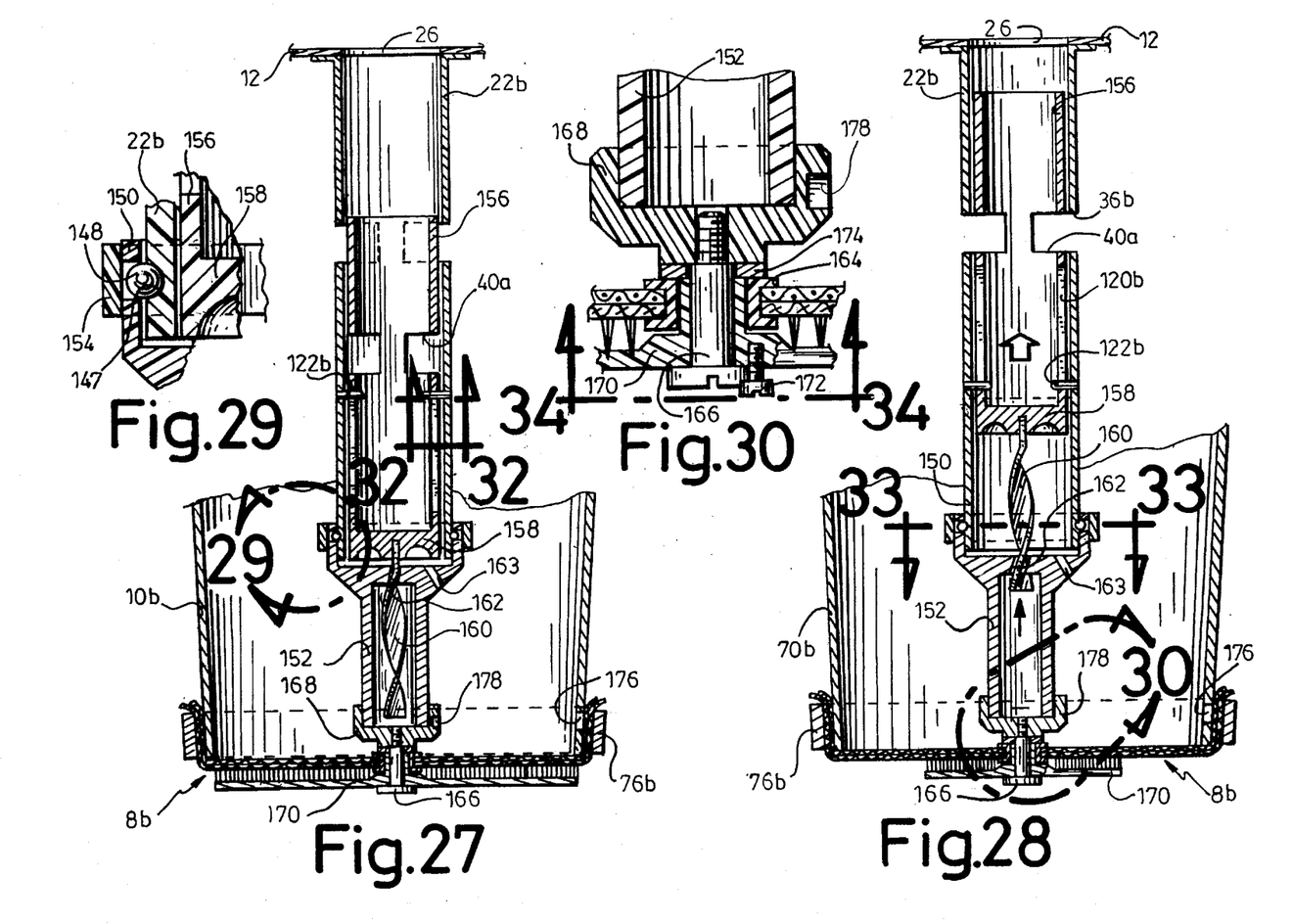
FIGS. 27 and 28 show yet another embodiment of the system to clean the filter of a central vacuum cleaning apparatus in the downward limit position and upward limit position respectively of the combined plug and valve member.
FIG. 29 is a partial vertical section in area 29 of FIG. 27.
FIG. 30 is a partial vertical section on an enlarged scale taken in area 30 of FIG. 28.
Figure 31:
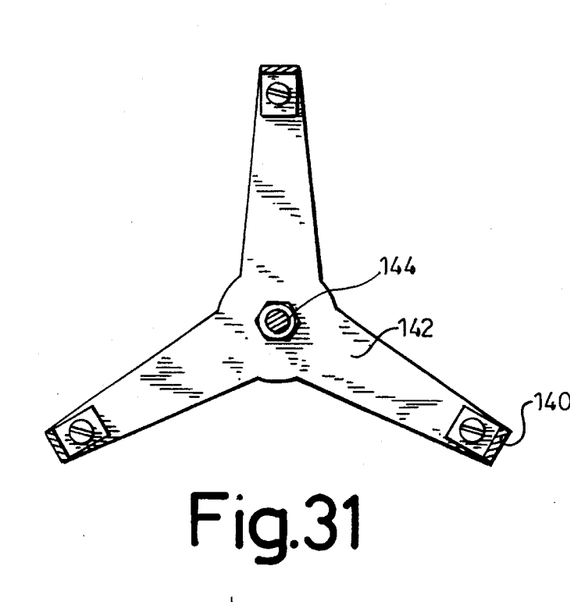
FIG. 31 is a plan section taken along line 31—31 of FIG. 24.
Figure 32:
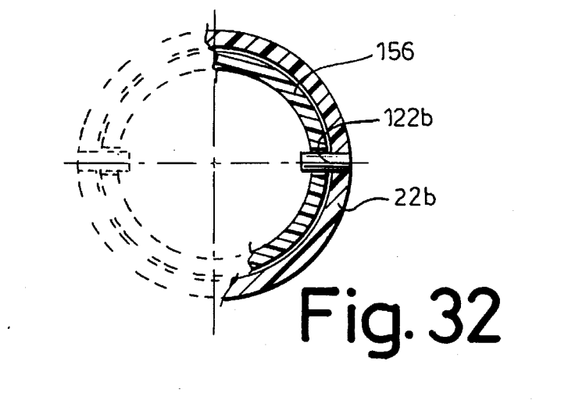
FIG. 32 is a partial plan section on an enlarged scale taken along line 32—32 of FIG. 27.
Figure 33:
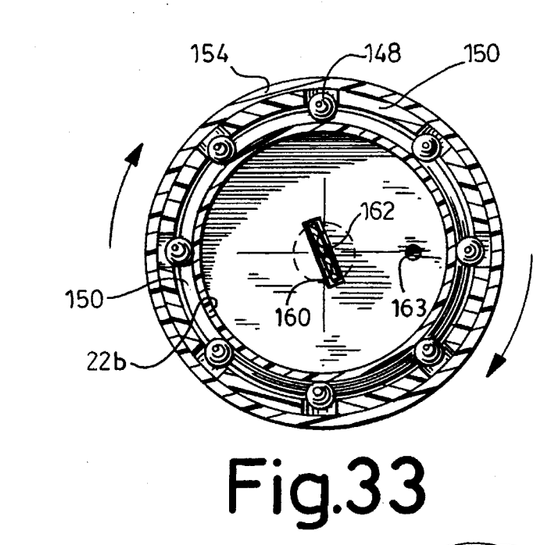
FIG. 33 is a plan section on an enlarged scale taken along line 33—33 of FIG. 28.
Figure 34:
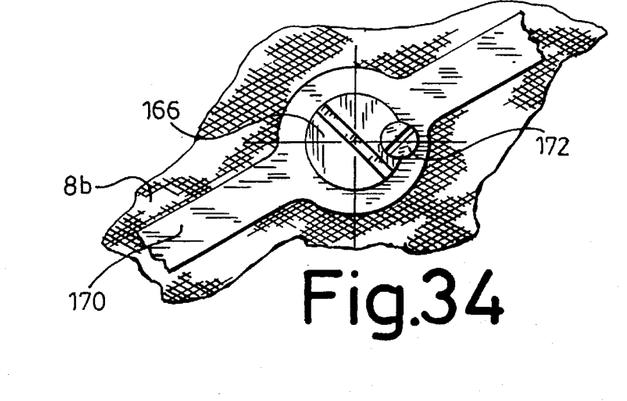
FIG. 34 is a bottom plan view on an enlarged scale taken along line 34—34 of FIG. 30.

FIGS. 27 to 30 and 32 to 34 show another embodiment of the system to clean the filter form the outside. A suction tube 22b is provided with bypass ports 36b. Its lower open end has a peripheral groove 147 forming a race track for ball bearings 148 carried in a cage 150 formed by an upward cylindrical extension of a tubular brush support 152. The balls of bearing 148 are retained against exit from the perforations of cage 150 by a retaining collar 154 surrounding cage 150. Brush support 152 is therefore freely rotatable about the axis of suction tube 22b. A combined valve and plug unit 156 similar to unit 116 of Figure is slidably mounted within suction tube 22b for movement between a lowermost position (as shown in FIG. 27) in which bypass ports 36b are closed by the valve part of unit 156 and an uppermost position (as shown in FIG. 28) in which the valve is opened, the lateral ports 40b of the valve of unit 156 being then in register with the bypass ports 36b of suction tube 22b. The plug part of unit 156 is formed by a partition 158 at the lower end of tubular unit 156. A spiral strip 160 is secured to the centre of partition 158 and extends downwardly, coaxially with suction tube and engages a diametrical slit 162 formed in the upper closed end of brush support 152. This closed end has air passages 163 which communicate with the underside of partition 158. Unit 156 is prevented from rotation by guiding pins 122b engaging slots 120b in a similar arrangement as guiding pins 122 and slots 120 of the embodiment of FIG. 21. The pin and slot arrangement also determines the upward and downward limit positions of unit 156. It is apparent that up and down movement of unit 156 causes the spiral strip 160 to rotate brush support 152 in an alternate manner about the axis of suction tube 22b.

A filter 8b corresponding to filter 8 of FIGS. 2 and 3 is stretched across the lower open end of the skirt 10b and retained by a collar 76b. All these parts correspond to the corresponding parts of FIGS. 2 and 3. The filter need not be provided with a reinforcing screen 72. Filter 8b has a central grommet 164 through which extends a shoulder bolt 166 which is screwed within a cup-shaped member 168 which tightly receives the lower open end of the brush support 152. Shoulder bolt 166 secures a diametral brush 170 to the cup-shaped member 168. The head of the shoulder bolt 166 has a notch receiving a locking bolt 172 which is threaded in brush 170.

The brush 170 rotates in an alternating or reciprocating manner against the outer face of the filter 8b to sweep away the dust particles clinging thereto.

Lock washer 174 prevents unscrewing of the shoulder bolt 176 from cup-shaped member 168.

After removal of lock bolt 172, shoulder bolt 166 can be unscrewed by first removing ring 76b and filter 8b and then by inserting a tool through aligned bore 176 of skirt 10b and blind hole 178 of cup 168 to hold brush support 152 against rotation.

It should be noted that the suction activated system of the present invention can be used to reciprocate devices other than a device for dislodging dust from the filter of a central vacuum cleaning apparatus.

I claim:

1. In combination, a central vacuum cleaning apparatus and a suction activated reciprocating system, said suction activated reciprocating system comprising a generally upright auction tube, a suction source communicating with the upper end of said suction tube, a plug slidable within said tube for upward movement to an upward limit position under the action of said suction source and for downward movement under gravity to a downward limit position when suction is not exerted on said plug through said tube, said tube having a bypass port located above said plug while in its upward limit position, and a valve member located in said tube above said plug and operable by said plug to take a valve position opening said bypass port during upward movement of said plug and operable by gravity to take a valve position closing said bypass port during downward movement of said plug whereby said plug continuously reciprocates up by suction and down by gravity upon sequential closing and opening of said bypass port;

said central vacuum cleaning apparatus comprising a dust collecting tank having a circular side wall, a closure plate closing the upper end of said tank, a dust transporting suction line extending though said closure plate and opening within said tank tangentially of its side wall, a chamber depending from said closure plate, said suction source including a motor operated air suction blower mounted on said closure plate and communicating with said chamber, said suction tube secured to said chamber and extending centrally and downward within said dust collecting tank, a skirt depending from said chamber, surrounding said suction tube and located within said dust collecting tank, said skirt having an open area, a filter extending across said open area whereby air and dust is discharged from said transporting suction line tangentially within said tank to cause a cyclonic effect and lighter weight dust particles collect on said filter and further including dust dislodging means acting on said filter and driven by said plug.

2. A cleaning apparatus as defined in claim 1, further including means to adjust the reciprocating frequency of said plug.

3. A cleaning apparatus as defined in claim 1, further including a chamber to which said upper end of said suction tube is connected, said suction source connected to said chamber, said chamber having a bypass opening exteriorly of said suction tube and further including a damper adjustably mounted across said bypass opening to adjustably vary the effective opening area of said bypass opening.

4. A cleaning apparatus as claimed in claim 3, wherein said valve member consists of an open ended, tubular section slidable within said suction tube, said tubular section having a lateral port which registers with said bypass port in an upper valve opening position of said tubular section and which comes out of register with said bypass port in a lower valve closing position of said tubular section.

5. A cleaning apparatus as defined in claim 4, further including means to adjust the reciprocating frequency of said plug.

6. A system as defined in claim 5, wherein said frequency adjusting means includes spring strips secured to said suction tube, extending across said bypass port and frictionally engageable with said tubular section while in its upward limit position to retard its downward movement under gravity.

7. A system as defined in claim 4, wherein said plug and said tubular section are two separate units slidable within said suction tube, said plug contacting said tubular section only in the upper portion of its upward stroke.

8. The combination as defined in claim 1, further including a bypass opening made in said chamber internally of said skirt and externally of said suction tube and damper means to adjust the effective free area of said bypass opening.

9. The combination as defined in claim 1, wherein said skirt forms an imperforate side wall which is opened at its lower end below the lower end of said suction tube and said filter extends across and is secured to the open lower end of said skirt and has a top surface facing said suction tube and a bottom surface, and said dust dislodging means include hammer members secured to said plug and movable up and down by said plug to effect a beating action on said top surface of said filter.

10. The combination as defined in claim 9, further including a bypass opening made in said chamber internally of said skirt and externally of said suction tube and damper means to adjust the effective free area of said bypass opening.

11. The combination as defined in claim 1, wherein said skirt forms a cylindrical perforated wall and an imperforate bottom wall, said filter extending around said perforated cylindrical wall, a circular brush surrounding said filter and a link means linking said circular brush to said plug through said bottom wall whereby reciprocating movement of said plug produces reciprocating up and down movement of said brush on said filter to dislodge dust particles adhering to said filter.

12. The combination as defined in claim 11, further including a bypass opening made in said chamber internally of said skirt and externally of said suction tube and damper means to adjust the effective free area of said bypass opening.

13. The combination as defined in claim 1, wherein said suction tube, said valve member and said plug are cylindrical bodies and further including means to prevent rotation of said valve member within said suction tube while allowing up and down movement of said valve member within said suction tube.

* * * * *